Figure 1:
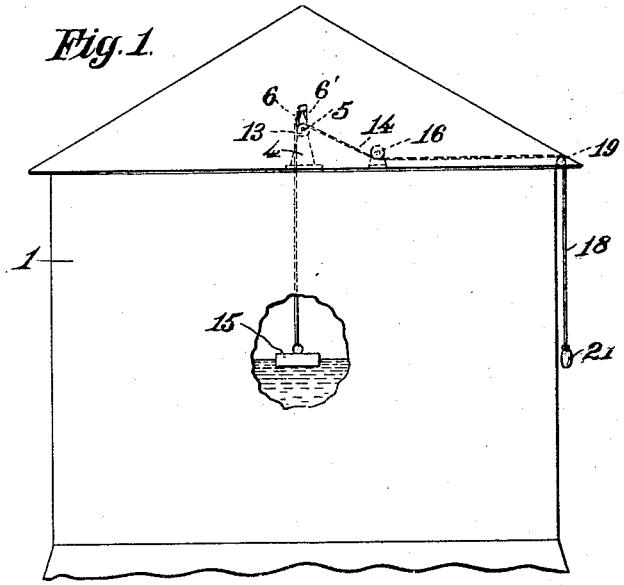

C. H. NEWTON.
WATER LEVEL GAGE.
APPLICATION FILED DEC. 15, 1915.

1,201,079.

Patented Oct. 10, 1916.
3 SHEETS—SHEET 1.

Inventor
Charles H. Newton

By Joshua R. H. Potts
Attorney

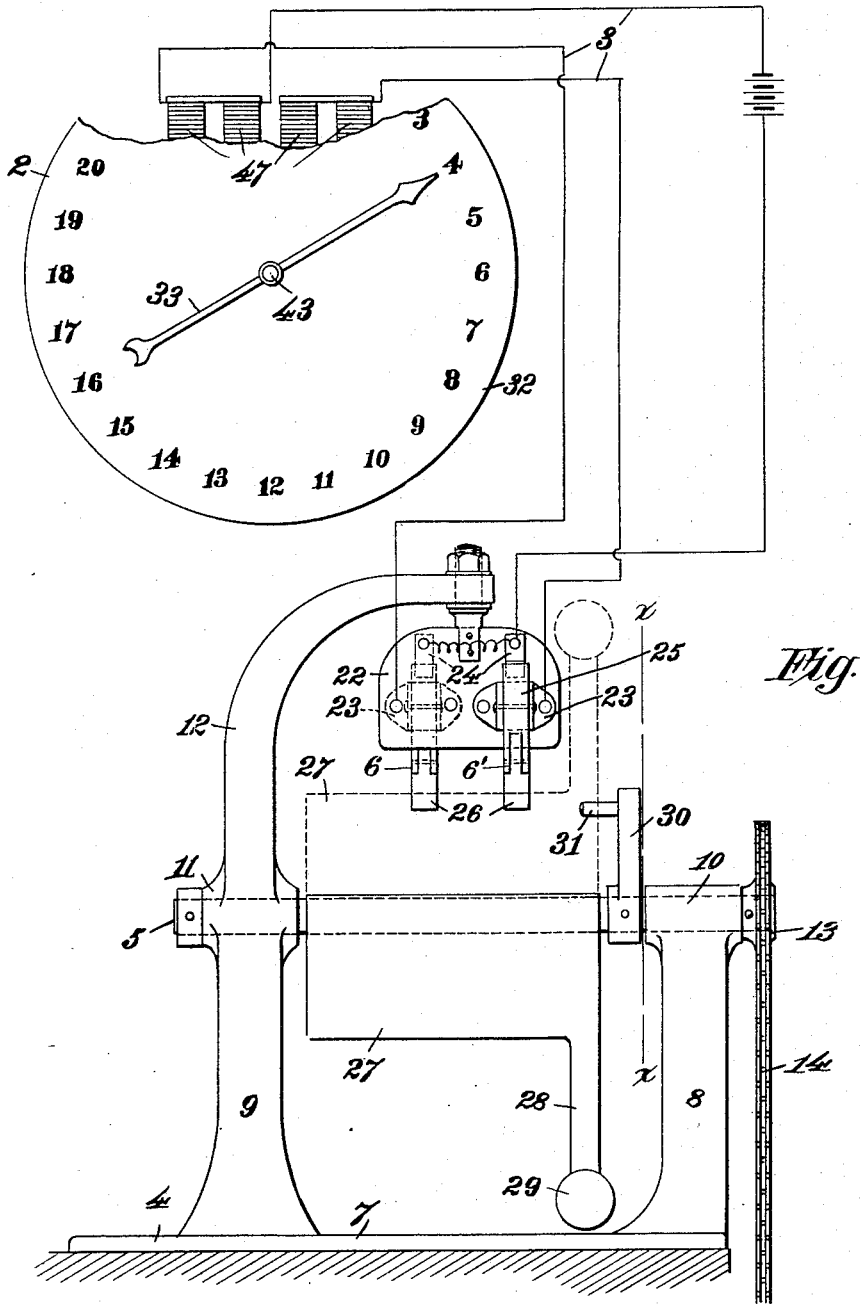

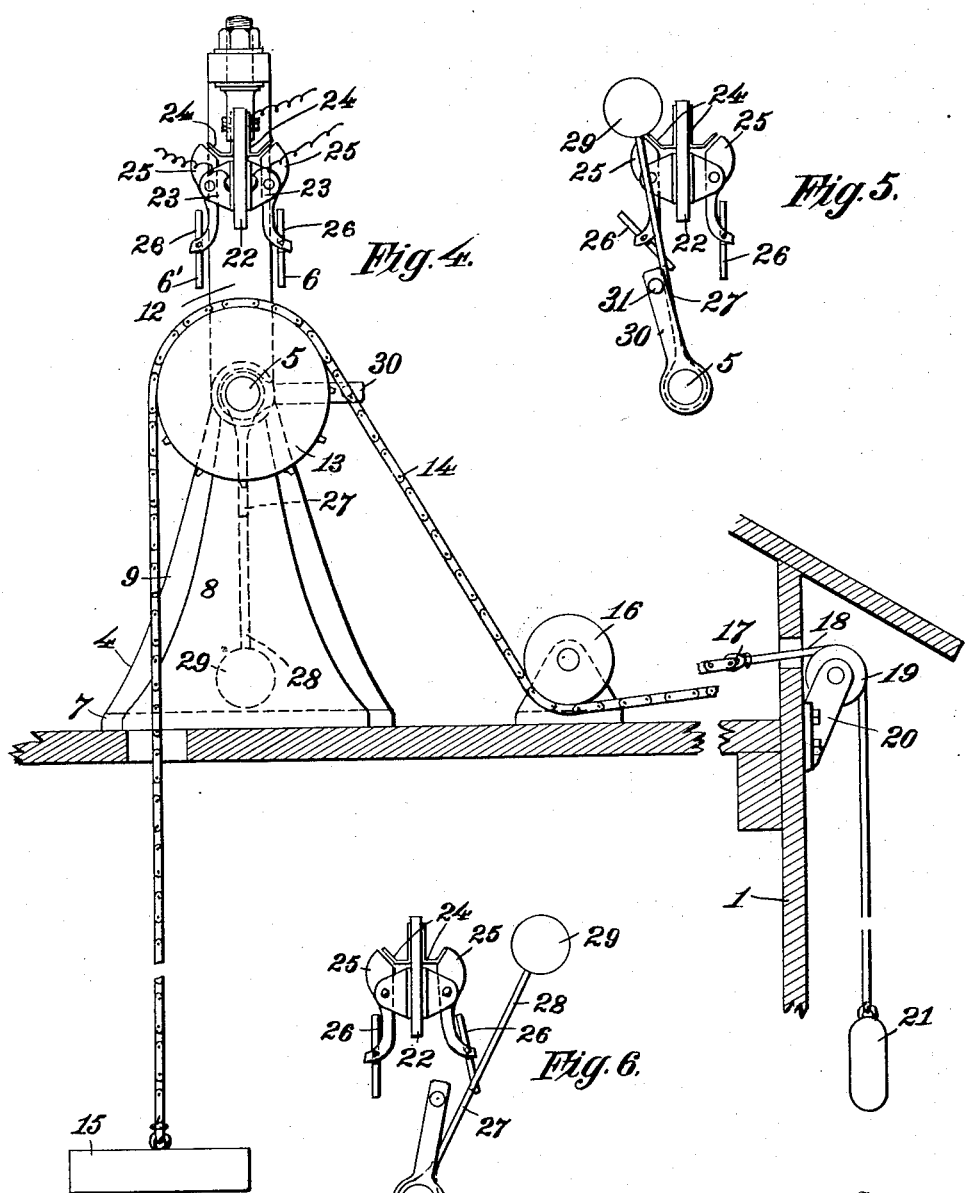

UNITED STATES PATENT OFFICE.

CHARLES H. NEWTON, OF PITTSTON, PENNSYLVANIA.

WATER-LEVEL GAGE.

1,201,079.  Specification of Letters Patent.  Patented Oct. 10, 1916.

Application filed December 15, 1915.  Serial No. 66,917.

*To all whom it may concern:*

Be it known that I, CHARLES H. NEWTON, a citizen of the United States, residing at Pittston, county of Luzerne, and State of Pennsylvania, have invented certain new and useful Improvements in Water-Level Gages, of which the following is a specification.

My invention relates to water level gages and particularly to water level gages especially adapted for use in conjunction with tanks or reservoirs.

The object of my invention is to provide a water level gage for tanks or reservoirs whereby the level of the water in said tank may be indicated at a point remote from the tank, and to this end my invention is particularly adapted for use in conjunction with tanks supplied through a pumping station, the indicator of the device being arranged at the pumping station to keep the operator thereof informed as to the level of the water in the tank.

A further object of my invention is to provide a device as mentioned further equipped with means for indicating at the tank the height of the water therein.

A further object of my invention is to provide a device of the character mentioned which may be readily installed in any tank or reservoir at low cost and which, after being established, will require practically no attention.

Other objects will appear hereinafter.

With these objects in view my invention consists generally in a rotary member mounted above the tank, a flexible member passing over the rotary member and provided at one end with a float and at the opposite end with a weight, a switch arranged adjacent said rotary member, an indicator, preferably remote from the tank, an electric circuit from said indicator to said switch and means operable by the rotation of said rotary member for successively operating said switch to close the circuit to the indicator.

My invention further consists in a device as mentioned further characterized by providing two switches in said circuit to be operated by said rotary member, one of said switches being operated as the rotary member turns in one direction and the other when said member turns in the opposite direction in order to operate the indicator in both positive and reverse directions according to the rise and fall of the water in the tank.

My invention further consists in a device as mentioned in which the weight is arranged upon the outside of the tank and the tank wall provided with a scale adjacent the weight so that the weight may indicate the level of the water within the tank.

My invention further consists in an electrically operated indicator, in combination with a switch arranged in the circuit of the indicator and means governed by the variation of water level in a tank for operating said switch, said indicator being provided with means for adjusting or regulating the amount or distance of operation of the indicator hand at each operation of the switch.

My invention further consists in an indicator, etc., as above mentioned in which the indicator is further provided with means to prevent movement of the indicator hand beyond the positive movement imparted thereto by the operating mechanism.

My invention further consists in various details of construction and arrangement of parts all as will be fully described hereinafter and particularly pointed out in the claims.

My invention will be more readily understood by reference to the accompanying drawings, forming a part of this specification, and in which—

Figure 2:
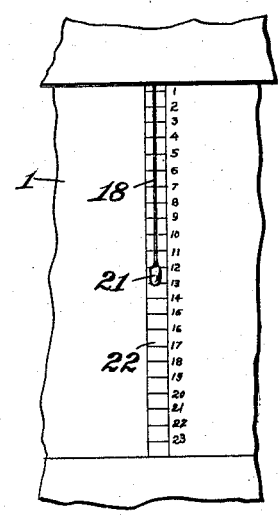
Figure 7:
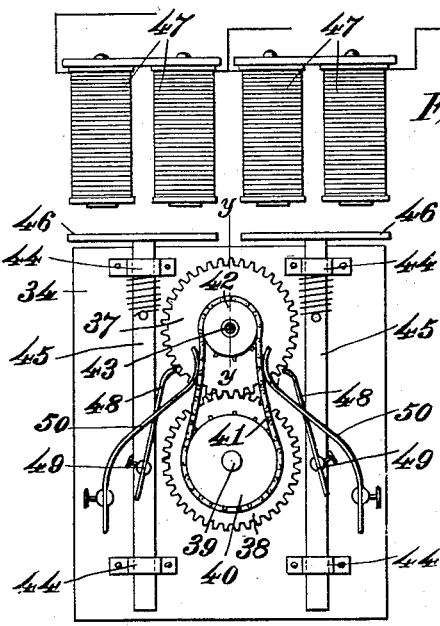
Figure 8:
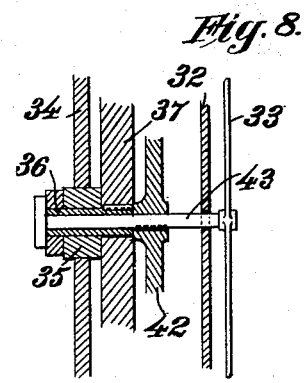

Figure 1 is an elevation of a tank equipped with a water level indicator embodying my invention, Fig. 2 is a detail or fragmentary elevation of the tank illustrating the scale employed in conjunction with the weight, Fig. 3 is a side elevation of the switch and switch operating mechanism together with the indicator illustrating the lay out of the electric circuit connecting the same, Fig. 4 is a front elevation of the switches and switch operating mechanism, Figs. 5 and 6 are detail views illustrating the manner of operating the switches, Fig. 7 is a detail view of the indicator mechanism, and Fig. 8 is a section on the line $y$—$y$ of Fig. 7, upon an enlarged scale.

Referring now to the drawings, 1 indicates a tank or reservoir and 2 an indicator arranged at a remote point from said tank and connected thereto by an electric circuit 3. Arranged above the water space in the tank and preferably within the tank are the switches and switch operating mechanism. This comprises a bracket 4 in which is rotatably mounted a shaft 5, a pair of switches 6—6' and means on said shaft for operating said switches.

The bracket comprises a base 7 and a pair of standards or uprights 8 and 9 provided with bearings 10 and 11 respectively for the shaft 5, the standard 9 being extended upwardly as at 12 to support the switches as will be described more fully hereinafter. Upon the shaft 5, preferably at one end thereof is arranged a sprocket wheel 13 over which passes a sprocket chain 14. One end of the chain extends downwardly from the sprocket wheel and is equipped at the end with a float 15 adapted to rest upon the water within the tank. The other end of the chain 14 passes under an idler 16 and is connected at its end as at 17 to a cable 18 passing over an idler 19 preferably arranged in a bracket 20 upon the outer wall of the tank 1 so that the weight 21 upon the free end of the cable may be suspended upon the outside of the tank as illustrated in the several views, although it is obvious that if preferred the weight may be suspended within the tank. When it is desired to provide an indicator at the tank the weight is suspended upon the outside thereof, as shown and a scale 22 is arranged adjacent the weight, as shown in Fig. 2, said scale being preferably painted upon the wall of the tank.

The upper portion 12 of the bracket standard 9 is arched over the shaft 5 as shown clearly in Fig. 3 and at its end supports a plate 22 upon which the switches 6 and 6' are mounted. In order to insulate said switches, the plate 22 may be formed of fiber or other insulating material. The switches are mounted upon opposite sides of the plate 2 and each comprises a bracket 23 and fixed contact 24, a contact lever 25 pivotally mounted in said bracket and a pivoted detent 26 on one end of said contact lever adapted for free movement in one direction but movable only with the lever in the opposite direction. Loosely mounted upon the shaft 5 is a switch operating member 27 which preferably comprises a plate provided with an arm 28 upon the end of which is a weight 29. Fixed to the shaft 5 is an arm 30 provided with a lateral extending pin or detent 31 extending into the path of the member 27. It is obvious that upon the rise or fall of the water level in the tank the shaft 5 will be rotated and that in so rotating the pin 31 will engage the member 27 and rotate it about the shaft 5. The switches are arranged in such a position that the pivoted detents 26 thereof extend into the path of the member 27 so that as said member 27 is rotated past said detents it will operate one or the other of said switches according to the direction in which it is rotated, and it is for this reason that said switches are arranged upon opposite sides of the plate 22. By referring to Figs. 5 and 6 of the drawings it will be seen that upon rotation of the member 27 in a clockwise direction, the same will pass the left hand switch without operating the same, but that upon engaging the detent 26 of the right hand switch said switch will be operated to close the circuit to the indicator. By referring to Figs. 3 and 7 of the drawings, it will be seen that the circuits from the switches to the indicator 2 are so arranged that the indicator will be operated to move the hand in one direction when one of the switches is operated and in the opposite direction when the other switch is operated. The indicator comprises a dial 32, an indicator hand 33 and electromagnet means for operating the latter upon operation of the switches 6 and 6'.

34 indicates a plate mounted behind the dial 32. Mounted in suitable bearings 35 in said plate is a tubular shaft 36 upon which is fixedly mounted a gear wheel 37 meshing with a similar gear 38 upon a stud shaft 39, also mounted on said plate. Rotatably connected to the wheel 38 is a sprocket wheel 40 connected by a sprocket chain 41 with a sprocket wheel 42 mounted upon a shaft 43 having a bearing in the shaft 36 and carrying at its outer end the indicator hand 33.

Mounted in suitable bearings 44, and upon opposite sides of the gear wheel 37, are longitudinally reciprocating members 45 upon the upper ends of which are secured armatures 46 and adjacent said armatures are arranged electromagnets 47—47. One of the magnets 47 is connected to the switch 6 and the other with the switch 6' so that one of the magnets is operated upon rise of the water in the tank and the other upon the fall of the water therein. Mounted upon each of the reciprocating members 45 is a pawl 48 which engages, upon operation of its respective magnet, the teeth of the wheel 42 and rotates the same, thereby, through the train of gears above described, turning the indicator hand 33. To adjust the throw of the hand at each operation of the device, the pawls 48 are adjustably mounted as at 49. In order to prevent the indicator hand from moving a greater distance than its positive movement through the action of the pawl 48, due to the momentum imparted to the parts, spring members 50 are provided which impinge against the sprocket chain 41. These are adjustably mounted as shown in order to permit of regulation of the pressure of the same on the chain.

The operation of the device is as follows: Assuming that water is being pumped into the tank the float will rise with the water level and the weight will correspondingly drop. At the tank, the amount of rise and fall is indicated by the position of the weight with relation to the adjacent scale. At the pumping station, where the indicator 2 is located, the rise is indicated by the hand 33 in the following manner: The sprocket wheel 13 on the shaft 5 is preferably twelve inches in circumference and the dial is arranged to indicate the rise and fall of water in feet, variations in the level of the water of less than one foot not being indicated. As the float rises, the shaft 5 will be rotated carrying with the same the arm 30. This, through the medium of the pin 31, will engage and carry with it the member 27. As the water reaches the next foot level the member 27 passes over the center of the shaft as shown in Figs. 5 and 6, passing the switch 6 without operating the same but operating the switch 6' to close the circuit to one of the magnets 47. This attracts its respective armature 46 and the pawl 48 carried by the stem of the armature moves the gearing at the indicator a sufficient distance to move the hand to indicate a change of one foot in the water level. Upon the fall of the water level in the tank, the shaft 5 will be rotated in the opposite direction thereby turning the member 27 in the opposite direction and operating switch 6 instead of switch 6'. This closes the circuit to the other magnet 47 and operates the gearing in the opposite direction to move the indicator so as to indicate a drop in the water level of one foot. It is obvious that the proper movement of the hand 33 may be obtained by adjustment of the pawls 48.

Although it is obvious that my invention may be employed for a variety of purposes, the primary purpose is to employ the same in conjunction with the pumping station used to supply water to a tank or reservoir, the indicator being arranged within the pumping station so that the operator may be kept informed as to the amount of water within the tank.

I claim:—

1. In an electrically operated indicator system, a tank in combination with a switch adjacent said tank and switch operating mechanism comprising a shaft, a member on said shaft, a flexible member passing over and operatively engaging the member on said shaft, a float upon one end of said flexible member, a weight upon the opposite end of said flexible member, a switch engaging element loosely mounted on said shaft and means on said shaft for bringing said loosely mounted member in engagement with said switch upon each complete revolution of said shaft, substantially as described.

2. In an electrically operated indicator system, a tank in combination with a pair of switches arranged adjacent said tank, and means for actuating said switches, said means comprising a rotary shaft, a wheel on said shaft, a flexible member passing over said wheel, and provided at one end with a weight and at the other end with a float, a member loosely mounted on said shaft, and adapted to engage said switches, one of said switches being adapted to be actuated only when the said member rotates in one direction and the other switch when the member rotates in the opposite direction, and means on said shaft for engaging said loosely mounted member and bringing the same into engagement with said switches upon each complete revolution in either direction, substantially as described.

3. In an electrically operated indicator system, a tank in combination with a pair of switches arranged adjacent said tank, and means for actuating said switches, said means comprising a rotary shaft, a wheel on said shaft, a flexible member passing over said wheel, and provided at one end with a weight and at the other end with a float, a member loosely mounted on said shaft and adapted to engage said switches, one of said switches being adapted to be actuated only when the said member rotates in one direction and the other switch when the member rotates in the opposite direction, and means on said shaft for engaging said loosely mounted member and bringing the same into engagement with said switches upon each complete revolution in either direction, and a weighted arm on said loosely mounted member, substantially as described.

4. In an electrically operated indicator system, the combination of a tank with a circuit closing device, comprising an insulation plate, contact members secured to adjacent sides of said plate, brackets secured to adjacent sides of said plate, movable contact members pivotally mounted in said brackets, detents pivotally mounted on the lower ends of said movable contact members, a rotary shaft mounted beneath said plate, float controlled means for rotating said shaft, a movable member loosely mounted on said shaft, a second member secured on said shaft and adapted to rotate therewith and to engage said loosely mounted member upon each rotation of said shaft to operate one or the other of said movable contact points to close the circuit and actuate said indicator, as and for the purpose set forth.

In testimony whereof I have signed my name to this specification in the presence of two subscribing witnesses.

CHARLES H. NEWTON.

Witnesses:
HARRY B. MILLER,
FRED A. RENDLE.